United States Patent [19]

Maier

[11] 4,406,458
[45] Sep. 27, 1983

[54] FLANGE SEAL

[75] Inventor: Eduard A. Maier, Munich, Fed. Rep. of Germany

[73] Assignee: Max-Planck-Gesellschaft, Göttingen, Fed. Rep. of Germany

[21] Appl. No.: 318,770

[22] Filed: Nov. 6, 1981

[30] Foreign Application Priority Data

Nov. 7, 1980 [DE] Fed. Rep. of Germany ....... 3042097

[51] Int. Cl.³ .................... F16J 15/40; F16J 15/46; F16L 17/00
[52] U.S. Cl. ......................................... 277/3; 277/27; 277/235 R; 277/DIG. 6; 277/189.5
[58] Field of Search ................... 277/3, 27, 135, 168, 277/189.5, 235 A, 235 B, 235 R, DIG. 6

[56] References Cited

U.S. PATENT DOCUMENTS

| 2,513,178 | 6/1950 | Jackson. | |
|---|---|---|---|
| 2,553,750 | 4/1951 | Cole | 277/235 X |
| 3,158,380 | 11/1964 | Carrel et al. | |
| 4,066,269 | 1/1978 | Linne | 277/DIG. 6 |
| 4,191,385 | 3/1980 | Fox et al. | 277/3 |

FOREIGN PATENT DOCUMENTS

| 565642 | 12/1932 | Fed. Rep. of Germany. | |
|---|---|---|---|
| 1525589 | 11/1969 | Fed. Rep. of Germany ... | 277/235 B |
| 806617 | 5/1970 | Fed. Rep. of Germany. | |
| 2051981 | 7/1970 | Fed. Rep. of Germany. | |
| 2206617 | 8/1973 | Fed. Rep. of Germany. | |
| 2616512 | 3/1976 | Fed. Rep. of Germany. | |
| 2817666 | 10/1979 | Fed. Rep. of Germany. | |

Primary Examiner—Stuart S. Levy
Assistant Examiner—Lloyd D. Doigan
Attorney, Agent, or Firm—Edwin E. Greigg

[57] ABSTRACT

A sealing assembly for oppositely disposed flanges having a sealing frame interposed therebetween, is proposed. The sealing frame has oppositely disposed grooves into each of which are affixed metal sealing elements and the oppositely disposed flanges have grooves into which are positioned O-rings that engage the metal sealing elements in said sealing frame. Further, an annular channel is disposed in each of the flanges whereby a vacuum may be established between the O-rings.

7 Claims, 2 Drawing Figures

FLANGE SEAL

BACKGROUND OF THE INVENTION

The invention relates to a flange seal, having a self-contained sealing frame disposed between two flanges which are to be connected in a pressure-tight manner. The sealing frame rests on the flanges with its sealing faces at either side, and a groove extends around and along each sealing face. A self-contained sealing element, preferably of metal, is fitted into the groove and may protrude somewhat beyond the sealing face.

German Patent No. P 28 17 666.1 describes an electrically insulating tube fitting for overpressure or vacuum systems, particularly in accelerator engineering, where individual tubular line sections must be connected to one another in a pressure-tight manner while being electrically insulated from one another; the joints must also be able to withstand high temperatures. Between the flanges to be connected, there is an annular disc of polymeric plastic, acting simultaneously as a sealing body and as an electrical insulator. This plastic may be, for example, a polyimide or aramide resin, which is far superior to metal or ceramic materials in terms of its mechanical strength and especially its wear and creep resistance. The outer diameter of the annular disc is smaller than the outer diameter of the flange, and the protruding flange parts are conventionally screwed together by bolts guided in insulating flange bushings.

Even when the surfaces of conventional insulating materials are machined to an extremely fine degree, a certain surface roughness still remains, making a complete vacuum seal impossible. Vacuum grease is generally used to fill in this roughness; it has the disadvantage, however, that at a very extreme vacuum its vapor pressure causes it to diffuse into the vacuum, thus contaminating the vacuum. As an alternative, therefore, the surfaces have been sealed as well, specifically in the case of insulating annular discs or sealing frames of hardened glass-mesh plates, which in practice cannot be rendered completely poreless and free of capillaries. However, sealing the surfaces is rather expensive and the surfaces are easily damaged, so that repairs involving a new application of resin, with subsequent grinding or polishing by hand, are frequently required. The difficulties associated with the known sealing frames become increasingly severe, the larger the dimensions of the sealing frame.

A flange seal is also known from German Offenlegungsschrift No. 26 16 512, in which grooves are machined into the sealing faces at either side of a sealing frame made of steel; round sealing rings are placed in these grooves and may be made of silver, copper or lead, for example, which are crushed when the flange seal is screwed together. If the sealing frames are to be used again after the flange connection has been opened, then the old sealing rings must be removed and new, not-yet-crushed sealing rings must be put into place. Furthermore, it is not possible with a seal of this kind to produce a connection which provides electrical insulation of the flanges from one another.

OBJECT AND SUMMARY OF THE INVENTION

The object of the invention is to create a sealing frame which makes it possible to seal off and electrically insulate the two flanges from one another at an extreme vacuum without grease or surface sealing, even in apparatus of large dimensions, and which is capable of withstanding severe mechanical, thermal and electrical stresses. This object is attained through the characteristics of this invention.

The flange seal according to the invention is particularly well suited for toroid vacuum vessels, such as are used for magnetic plasma containment. Such vessels may, for instance, comprise two halves electrically insulated from one another, flanged together in a vacuum-tight manner. Between the flanges, there is a sealing frame of insulating material which is stressed mechanically when it undergoes pressure and shearing and which is also stressed thermally and electrically. The required compression strength is 80 N/mm$^2$, and the shearing strength should be 25 N/mm$^2$, while the long-term temperature resistance must be 150° if there is compressive stress and 180° if there is no mechanical stress. The electrical voltage resistance must be on the order of magnitude of 200 V/mm. The shearing stress is caused by magnetic forces, resulting in relative movements of the two halves of the torus in the flange planes which are on the order of magnitude of a few tenths of a millimeter.

These requirements can be well satisfied by means of the flange seal embodied according to the invention. In a sealing frame of plastic reinforced with glass fibers, it is easy to attain a temperature resistance up to 230°, an electrical-insulation value up to 40 kV/10 mm, a surface leakage current resistance of KC=180 and a compression strength of 500 N/mm$^2$.

Further embodiments of the invention are disclosed herein.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
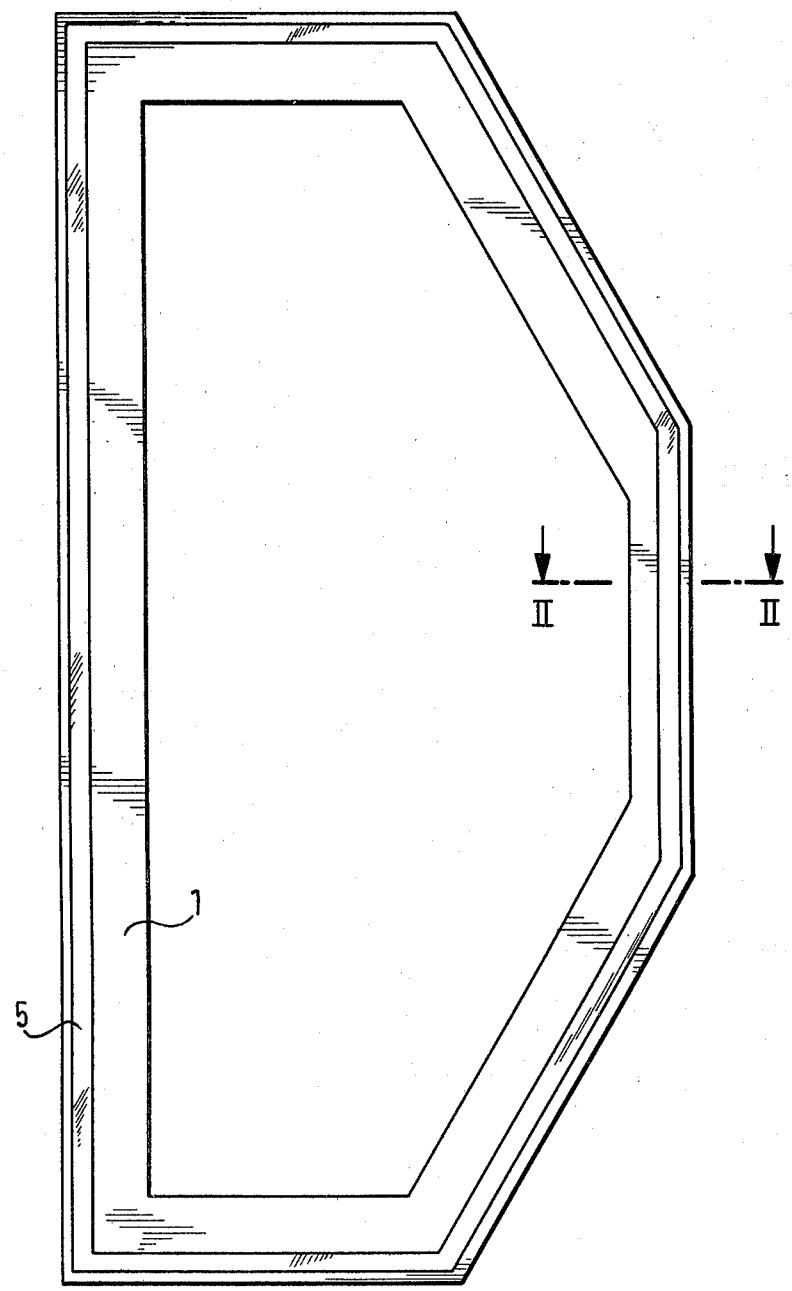
FIG. 1 is a top plan view of a sealing frame.
Figure 2:
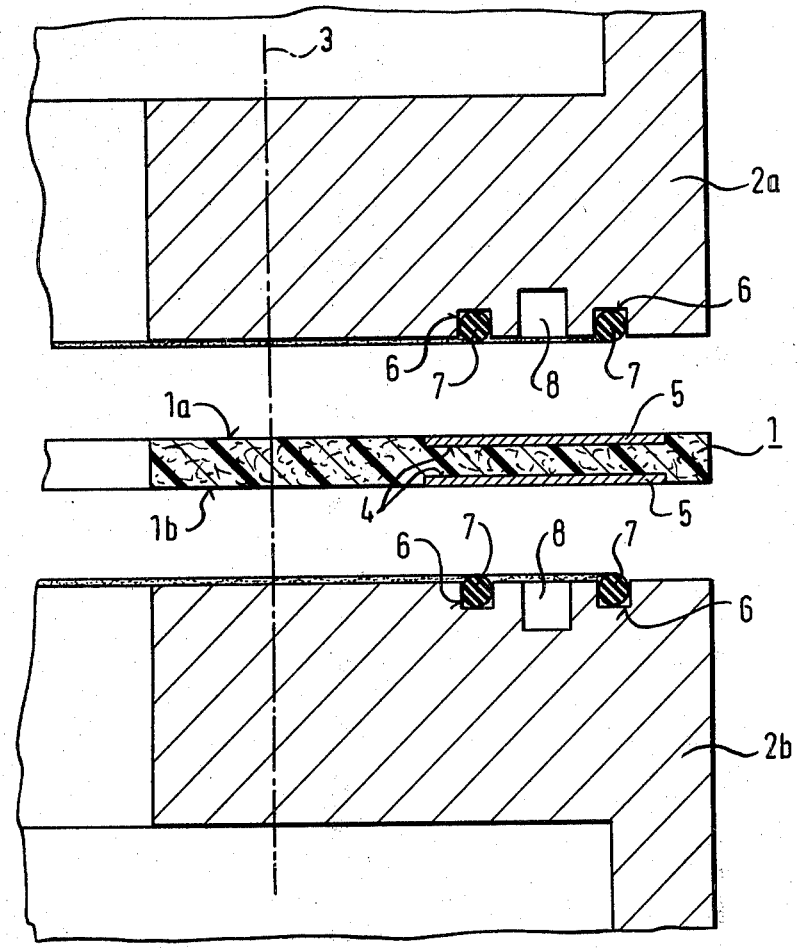
FIG. 2 is an exploded sectional view of a flange connection using the sealing frame of FIG. 1.

The sealing frame 1 shown in FIG. 1 is adapted in shape to the cross section of a toroid vacuum container. As shown in FIG. 2, it is disposed between two flanges 2a and 2b, which are pressed together by means of schematically indicated screw bolts 3. The sealing frame 1 is preferably made of plastic reinforced with glass fibers having the required mechanical, thermal and electrical properties and has recesses at either side in the form of a groove 4 extending completely therearound. Sealing elements 5 are cemented into the groove 4 and are preferably made of a non-magnetic metal. In the illustrated example, the sealing elements 5 are not disposed centrally within the cross section of the sealing frame 1; instead, they are shifted somewhat toward the outside, while the bores intended for the screw bolts 3, not shown in detail, are shifted toward the inside.

In the surfaces of the flanges 2a and 2b oriented toward one another, grooves 6 for receiving sealing rings 7 in the form of O-rings are embodied opposite the sealing elements 5 of the sealing frame 1. These double O-rings 7 rest against the sealing elements 5 and form a vacuum-tight seal, without vacuum grease having to be used. Between the inner and the outer O-ring, an annular channel 8 is also embodied in both flanges, forming an intermediate vacuum space in the double seal effected by the two O-rings.

The insulating materials for the sealing frames 1 which are available for withstanding the stresses mentioned above cannot be provided with such smooth surfaces that the conventional O-rings 7 would be capable of furnishing a sufficiently high-quality vacuum seal. Instead, it is practically impossible to so completely prevent pores, bubbles, surface cracks, furrows etc. in the sealing faces 1a and 1b that the requirements for reliable sealing of a relatively high vacuum are met; as a result, it has always been necessary heretofore to use surface sealing or vacuum grease. By using metal sealing elements in the area of actual vacuum sealing, that is, by using the O-rings 7, this disadvantage is overcome, since in contrast to the plastics which could be usable under such circumstances, metals can be machined to a degree of surface roughness sufficiently small that surface sealing or grease sealing is no longer required. When the invention is used in a vacuum container subjected to magnetic fields, a non-magnetic metal which does not cause disturbances in the magnetic field is used. In the case of temperature stresses, care should be taken that the material of the sealing frame and the material of the sealing elements, as well as the cement used to cement the sealing elements into the sealing frame, should be compatible with one another; that is, they should have approximately identical coefficients of thermal expansion, so that the cemented location remains tight. The dimensional relationships may be selected as needed such that the sealing elements 5 are somewhat thicker than the depth of the grooves 4, so that the sealing elements will protrude somewhat beyond the surfaces 1a, 1b, should this be efficacious in particular applications.

While previously conventional sealing frames of insulating material lacking inlaid sealing tracks 5 could not be realized with the surface smoothness required in high-vacuum seals, and sealing layers or vacuum greases were accordingly necessary, the sealing elements 5 may be suitably selected from various desirable materials in which the required surface smoothness can be attained without necessitating such provisions. As a result, it is possible to retain the conventional and inexpensive O-ring technology, which in the case of very high vacuums can be realized in multiple stages as well, using intermediate vacuum spaces, as is shown in FIG. 2. Because of this conventional technology, which does not require expensive specialized provisions, costs can also be kept relatively low. With the sealing elements 5 inlaid into the sealing frame 1, it is also possible to fabricate sealing frames of very large dimensions, which necessitates a reliable high-vacuum seal even with very large vacuum containers, such as those desired for magnetic plasma containment.

Naturally, the invention can also be applied to other vacuum containers, whenever the intention is to connect very large flanges to one another such that the connection is reliably tight under extreme vacuum conditions. In this case, the electrical insulation of the two flange elements from one another does not present any difficulties, because the sealing ring may be of any desired insulating material which is suitable for the noted stresses (mechanical, thermal, electrical etc.), without having to take into consideration the quality of surface smoothness attainable in such a material. For instance, it is possible to select a material for the sealing frame which can be heated without difficulty up to the required temperatures so that later, under vacuum conditions, it will no longer cause contamination of the vacuum under stress. The material can also be selected in terms of the required compression and shearing strength and/or the electrical insulation capacity which may be required for a particular case. Plastic reinforced with glass fibers has proved to be a suitable material, obtainable with the desired properties—that is, capable of meeting the requirements for temperature resistance of 230°, electrical-insulation strength of up to 40 kV/10 mm, a surface leakage current resistance of $KC=180$, and a compressive strength up to 500 $N/cm^2$, as was required for a practically built vacuum container for magnetic plasma containment.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A flange seal having a self-contained sealing frame interposed between two flanges to be connected in a pressure-tight manner, said sealing frame having oppositely disposed groove means, each of said oppositely disposed groove means provided with a metal sealing element, further characterized in that said sealing frame is made of an electrically insulating material and each of said flanges are provided with a sealing face arranged to engage said metal sealing elements, each of said sealing faces being further provided with groove means arranged to receive O-rings and said O-rings arranged to engage opposite faces of said metal sealing elements, and an annular channel provided in the sealing face of each of said flanges between said groove means in said flanges in order to form an intermediate vacuum space between O-rings placed in said groove means in said flanges.

2. A flange seal as defined by claim 1, characterized in that the metal sealing elements are cemented into said groove means disposed in said sealing frame.

3. A flange seal as defined by claim 2, characterized in that said sealing frame, said metal sealing element and said cement are substantially compatible with one another in terms of thermal stress.

4. A flange seal as defined by claim 1, characterized in that said sealing frame is made of plastic reinforced with glass fibers.

5. A flange seal as defined by claim 1, characterized in that said metal sealing element is made of a non-magnetic material.

6. A flange seal as defined by claim 5, characterized in that said sealing frame, said metal sealing element and said cement are substantially compatible with one another in terms of thermal stress.

7. A flange seal as defined by claim 1, characterized in that said sealing frame, said metal sealing element and said cement are substantially compatible with one another in terms of thermal stress.

* * * * *

UNITED STATES PATENT AND TRADEMARK OFFICE
CERTIFICATE OF CORRECTION

PATENT NO. : 4,406,458
DATED     : September 27, 1983
INVENTOR(S) : Edward Albert MAIER It is certified that error appears in the above—identified patent and that said Letters Patent is hereby corrected as shown below:

Column 2, line 15, change "150°" to read --150°C---.

line 16, change "180°" to read --180°C---.

line 26, change "230°" to read --230°C---.

Column 4, line 15 change "230°" to read --230°C---.

Signed and Sealed this

Fifteenth Day of May 1984

[SEAL]

Attest:

GERALD J. MOSSINGHOFF

Attesting Officer     Commissioner of Patents and Trademarks